United States Patent
Hirai et al.

(10) Patent No.: US 11,814,601 B2
(45) Date of Patent: Nov. 14, 2023

(54) METHOD FOR REDUCING CONTENT OF SATURATED HYDROCARBON, AND REFINED PALM-BASED OILS AND/OR FATS

(71) Applicant: The Nisshin OilliO Group, Ltd., Tokyo (JP)

(72) Inventors: Hiroshi Hirai, Selangor Darul Ehsan (MY); Chee Keat Yong, Selangor Darul Ehsan (MY); Hiroyuki Kozui, Yokohama (JP)

(73) Assignee: The Nisshin OilliO Group, Ltd., Tokyo (JP)

( * ) Notice: Subject to any disclaimer, the term of this patent is extended or adjusted under 35 U.S.C. 154(b) by 0 days.

(21) Appl. No.: 16/759,984

(22) PCT Filed: Oct. 24, 2018

(86) PCT No.: PCT/JP2018/039486
§ 371 (c)(1),
(2) Date: Apr. 28, 2020

(87) PCT Pub. No.: WO2019/087894
PCT Pub. Date: May 9, 2019

(65) Prior Publication Data
US 2020/0332221 A1    Oct. 22, 2020

(30) Foreign Application Priority Data

Nov. 2, 2017    (JP) ................................ 2017-212843

(51) Int. Cl.
*C11B 3/12* (2006.01)
*B01D 3/12* (2006.01)

(52) U.S. Cl.
CPC .    *C11B 3/12* (2013.01); *B01D 3/12* (2013.01)

(58) Field of Classification Search
CPC .... B01D 3/12; C11B 3/12; C07C 7/04; C07C 9/22; A61K 8/31
See application file for complete search history.

(56) References Cited

U.S. PATENT DOCUMENTS

| | | | | |
|---|---|---|---|---|
| 1,925,559 A | * | 9/1933 | Hickman | B01D 3/12 203/89 |
| 4,554,107 A | * | 11/1985 | Takao | C11B 3/12 554/212 |
| 4,623,488 A | * | 11/1986 | Takao | C11B 3/12 554/224 |
| 5,932,261 A | * | 8/1999 | Unnithan | A23D 9/02 426/417 |
| 9,765,281 B2 | | 9/2017 | Bruse | |
| 2005/0051419 A1 | * | 3/2005 | Zima | B01D 3/14 203/43 |
| 2016/0298053 A1 | | 10/2016 | Bruse | |

FOREIGN PATENT DOCUMENTS

| | | |
|---|---|---|
| CN | 103805337 A | 5/2014 |
| CN | 105219534 A | 1/2016 |
| EP | 3428255 A1 | 1/2019 |
| JP | 1999-293276 A | 10/1999 |
| JP | 2002-511108 A | 4/2002 |
| JP | 2010-248340 A | 11/2010 |
| JP | 2018-100331 A | 6/2018 |
| WO | WO 2013/084567 A1 | 6/2013 |
| WO | WO 2015/057139 A1 | 4/2015 |
| WO | WO 2017/154638 A1 | 9/2017 |
| WO | WO 2018/117158 A1 | 6/2018 |

OTHER PUBLICATIONS

Japir, A.A.-W.; Salimon, J.; Derawi, D.; Bahadi, M.; Yusop, M.R. Separation of free fatty acids from high free fatty acid crude palm oil using short-path distillation. AIP Conf. Proc. 2016, 1784. (Year: 2016).*
"Laboratory Plants for Thin Film and Short Path Distillation", Aug. 25, 2016 (date obtained from Wayback Machine), Verfahrens-Technische Anlagen GmbH, URL: https://www.mitec-eng.it/doc/VTA_laboratory.pdf (Year: 2016).*
Gelmez, B., Ketenoglu, O., Yavuz, H. and Tekin, A. (2017), Removal of di-2-ethylhexyl phthalate (DEHP) and mineral oil from crude hazelnut skin oil using molecular distillation—multiobjective optimization for DEHP and tocopherol. Eur. J. Lipid Sci. Technol., 119: 1600001. https://doi.org/10.1002/ejlt.201600001.*
EFSA Panel on Contaminants in the Food Chain (CONTAM), "Scientific Opinion on Mineral Oil Hydrocarbons in Food", European Food Safety Authority (EFSA), EFSA Journal 2012; 10(6):2704.*
"Liquids—Densities", The Engineering ToolBox, https://www.engineeringtoolbox.com/liquids-densities-d_743.html.*
Lin, S.W. and Yoo, C.K. (2009), Short-path distillation of palm olein and characterization of products. Eur. J. Lipid Sci. Technol., 111: 142-147. https://doi.org/10.1002/ejlt.200800092.*
"1. Composition of Palm Oil", post by user YCW on Oil Palm Knowledge Base, Jan. 25, 2014, https://oilpalmblog.wordpress.com/2014/01/25/1-composition-of-palm-oil/.*
Wright, "Hazelnut Oil", Botanical Formulations, Sep. 16, 2022, https://www.botanicalformulations.com/oil-monographs/hazelnut-oil#:~:text=Hazelnut%20oil%20has%20high%20amounts,%2C%20phosphorus%2C%20manganese%20and%20Magnesium.*
"Saponification Chart", From Nature With Love, https://www.fromnaturewithlove.com/resources/sapon.asp.*
"Fat Composition of Hazelnut Oil", the conscious life, https://theconsciouslife.com/foods/hazelnut-oil-04532.htm.*

(Continued)

*Primary Examiner* — Jonathan Luke Pilcher
(74) *Attorney, Agent, or Firm* — Knobbe, Martens, Olson & Bear LLP

(57) ABSTRACT

A method for reducing the content of a saturated hydrocarbon in oils and/or fats. The method includes subjecting raw material oils and/or fats to a short path distillation treatment under a temperature condition of 50° C. or higher and 270° C. or lower. In the short path distillation treatment, a feed rate of the raw material oils and/or fats to a short path distillation apparatus may be 30.0 kg/h·m² or less per unit area of an evaporation surface of the short path distillation apparatus. The feed rate may be 5.00 kg/h·m² or more and 25.0 kg/h·m² or less per unit area of an evaporation surface of the short path distillation apparatus.

5 Claims, No Drawings

(56) References Cited

OTHER PUBLICATIONS

"Fat Composition of Palm Oil", the conscious life, https://theconsciouslife.com/foods/palm-oil-04055.htm.*
Extended European Search Report issued in European Patent Application No. 18872593.1, dated Feb. 22, 2021.
Beyza Gelmez et. al., Removal of di-2-ethylhexyl phthalate(DEHP) and mineral oil from crude hazelnut skin oil using molecular distillation—multiobjective optimization for DEHP and tocopherol; European Journal of Lipid Science and Technology, vol. 119, No. 2 pp. 1600001/1-1600001/7 (2017).

* cited by examiner

METHOD FOR REDUCING CONTENT OF SATURATED HYDROCARBON, AND REFINED PALM-BASED OILS AND/OR FATS

This application is the U.S. National Phase under 35 U.S.C. § 371 of International Application PCT/JP2018/039486, filed Oct. 24, 2018, designating the U.S., and published in Japanese as WO 2019/087894 on May 9, 2019, which claims priority to Japanese Patent Application No. 2017-212843, filed Nov. 2, 2017, the entire contents of which are incorporated herein by reference.

TECHNICAL FIELD

The present invention relates to a method for reducing the content of a saturated hydrocarbon, and refined palm-based oils and/or fats.

BACKGROUND ART

Various trace components are present in oils and/or fats. Examples of such trace component include glycidol, 3-chloropropane-1,2-diol, a fatty acid ester thereof, and the like. It has been pointed out that the trace components mentioned above may have nutritional problems. However, if the amount of the trace component is the level present in oils and/or fats such as vegetable oil, which have been ingested from meals and the like for a long period of time, it is not considered that the trace component does not immediately affect health, and consumption criteria have not been set. However, since there are needs for oils and/or fats with high safety, there have been proposed various methods for reducing the above components in oils and/or fats (for example, Patent Document 1, etc.).

There has also been known that a trace component derived from a raw material is contained in oils and/or fats, and examples of such component include a saturated hydrocarbon. Also regarding the saturated hydrocarbon, if the amount is the level present in oils and/or fats which have been ingested from ordinary meals and the like, it is not considered that the saturated hydrocarbon does not affect health.

Patent Document 1: Pamphlet of PCT International Publication No. WO2015/057139(A1)

DISCLOSURE OF THE INVENTION

Problems to be Solved by the Invention

Here, the saturated hydrocarbon is also a component contained in mineral oil, so that the saturated hydrocarbon can also be contained in food materials contaminated with mineral oil. In such a case, even if no mineral oil is contained in oils and/or fats themselves mixed in food materials, it is impossible to distinguish a saturated hydrocarbon derived from oils and/or fats from a saturated hydrocarbon derived from food materials by analysis, and thus it may be judged that mineral oil is contained in oils and/or fats. Therefore, as a result, there existed a situation that is almost the same situation where oils and/or fats containing a saturated hydrocarbon are produced. If food materials containing oils and/or fats are contaminated with a saturated hydrocarbon, it is impossible to remove the saturated hydrocarbon. Therefore, it is difficult that the food materials are utilized not only in food applications, but also in applications except foods, and thus the food materials are sometimes disposed.

Thereby, regardless of the derivation of the saturated hydrocarbon, there were needs for a method for reducing the content of the saturated hydrocarbon in oils and/or fats.

In light of the above circumstances, the present invention has been made and an object thereof is to provide a method for reducing the content of a saturated hydrocarbon in oils and/or fats.

Means for Solving the Problems

The present inventors have found that the above problems can be solved by subjecting raw material oils and/or fats to a short path distillation treatment under the temperature condition of 50° C. or higher and 270° C. or lower, thus completing the present invention. Specifically, the present invention provides the followings.

(1) A method for reducing the content of a saturated hydrocarbon in refined oils and/or fats, the method including subjecting raw material oils and/or fats to a short path distillation treatment under the temperature condition of 50° C. or higher and 270° C. or lower.

(2) The reduction method according to (1), wherein, in the short path distillation treatment, a feed rate of the raw material oils and/or fats to a short path distillation apparatus is 30.0 kg/h·m$^2$ or less per unit area of an evaporation surface of the short path distillation apparatus.

(3) The reduction method according to (2), wherein the feed rate is 5.00 kg/h·m$^2$ or more and 25.0 kg/h·m$^2$ or less per unit area of an evaporation surface of the short path distillation apparatus.

(4) The reduction method according to any one of (1) to (3), wherein the pressure condition in the short path distillation treatment is the degree of vacuum of 0.1000 Pa or less.

(5) The reduction method according to any one of (1) to (4), wherein the upper limit of the temperature condition in the short path distillation treatment is 200° C. or lower, and the feed rate of the raw material oils and/or fats to the short path distillation apparatus is 25.0 kg/h·m$^2$ or less per unit area of an evaporation surface of the short path distillation apparatus.

(6) The reduction method according to any one of (1) to (5), wherein the upper limit of the temperature condition in the short path distillation treatment is 200° C. or lower, and the pressure condition is the degree of vacuum of 0.0001 Pa or more and 0.0200 Pa or less.

(7) The reduction method according to any one of (1) to (6), wherein the short path distillation treatment is performed two times or more.

(8) The reduction method according to any one of (1) to (7), wherein the raw material oils and/or fats are oils and/or fats which are not subjected to heating at 200° C. or higher.

(9) The reduction method according to any one of (1) to (8), wherein the raw material oils and/or fats are palm-based oils and/or fats.

(10) The reduction method according to (9), wherein the content of a saturated hydrocarbon in the palm-based oils and/or fats after the short path distillation treatment is 15 mg/kg or less.

(11) Refined palm-based oils and/or fats, wherein the content of a saturated hydrocarbon having 20 or more and 35 or less carbon atoms is 15 mg/kg or less.

Effects of the Invention

According to the present invention, there is provided a method for reducing the content of a saturated hydrocarbon in oils and/or fats.

PREFERRED MODE FOR CARRYING OUT THE INVENTION

Embodiments of the present invention will be described below, but the present invention is not limited to the following embodiments.

A method for reducing the content of a saturated hydrocarbon in refined oils and/or fats of the present invention (hereinafter also referred to the "reduction method of the present invention") includes subjecting raw material oils and/or fats to a short path distillation treatment under the temperature condition of 50° C. or higher and 270° C. or lower. The reduction method of the present invention will be described in detail below. In the present invention, "raw material oils and/or fats" mean oils and/or fats to be subjected to a short path distillation treatment, and "refined oils and/or fats" mean oils and/or fats subjected to a short path distillation treatment.

[Short Path Distillation Treatment]

Raw material oils and/or fats in the present invention are subjected to a short path distillation treatment. The short path distillation treatment is a treatment in which raw material oils and/or fats are evaporated by heating in a state of a thin film under reduced pressure under the condition where a condenser is arranged within a distance shorter or longer roughly than the mean free path of vapor molecules. Such treatment makes it possible to obtain a residual fraction in which a distillation fraction is separated from raw material oils and/or fats (which corresponds to refined oils and/or fats). Fatty acid, monoglyceride and/or diglyceride can be contained in the distillation fraction. Triglyceride is contained in the residual fraction.

As a result of the present inventors' study, it has been found that, when raw material oils and/or fats are subjected to a short path distillation treatment, the content of a saturated hydrocarbon in oils and/or fats can be reduced by adjusting the temperature condition in a range of 50° C. or higher and 270° C. or lower. In the present invention, "saturated hydrocarbon" means compounds including neither a double bond nor a triple bond, and particularly a compound having 10 or more and 56 or less carbon atoms (preferably 20 or more and 35 or less carbon atoms) among the compounds.

The temperature condition of the short path distillation treatment in the present invention corresponds to the temperature of an evaporation surface of a short path distillation apparatus (evaporator temperature). In the present invention, "subjecting raw material oils and/or fats to a short path distillation treatment under the temperature condition of 50° C. or higher and 270° C. or lower" means bringing raw material oils and/or fats into contact with an evaporation surface (evaporator) at a temperature of 50° C. or higher and 270° C. or lower.

When the temperature condition of the short path distillation treatment is 50° C. or higher, preferably 80° C. or higher, more preferably 120° C. or higher, and still more preferably 200° C. or higher, it is possible to efficiently reduce the content of a saturated hydrocarbon while removing a substance unstable to heat, a high boiling point substance, and the like contained in raw material oils and/or fats. In a range of the temperature condition of the present invention, the higher the temperature, it becomes easier to reduce the content of a saturated hydrocarbon.

When the temperature condition of the short path distillation treatment is 270° C. or lower, and preferably 230° C. or lower, it is possible to reduce the content of a saturated hydrocarbon while increasing a yield by reducing a distillation fraction ratio.

More preferred temperature condition in the short path distillation treatment is in a range of 80° C. or higher and 120° C. or lower, 80° C. or higher and 270° C. or lower, 80° C. or higher and 230° C. or lower, 120° C. or higher and 230° C. or lower, 160° C. or higher and 270° C. or lower, 160° C. or higher and 230° C. or lower, 200° C. or higher and 270° C. or lower, or 200° C. or higher and 230° C. or lower.

As a result of the present inventors' study, it has been found, surprisingly, that the lower a feed rate of raw material oils and/or fats to a short path distillation apparatus to be used in a short path distillation treatment, it becomes easier to reduce the content of a saturated hydrocarbon. Specifically, when a feed rate of raw material oils and/or fats to a short path distillation apparatus is preferably 30.0 kg/h·m$^2$ or less, and more preferably 25.0 kg/h·m$^2$ or less, per unit area of an evaporation surface of the short path distillation apparatus, it is easier to reduce the content of a saturated hydrocarbon. The lower limit of the feed rate of raw material oils and/or fats to a short path distillation apparatus is not particularly limited, and is preferably 1.00 kg/h·m$^2$ or more, and more preferably 5.00 kg/h·m$^2$ or more, per unit area of an evaporation surface of the short path distillation apparatus.

Preferred feed rate of raw material oils and/or fats to a short path distillation apparatus is in a range of 1.00 kg/h·m$^2$ or more and 30.0 kg/h·m$^2$ or less, 5.00 kg/h·m$^2$ or more and 30.0 kg/h·m$^2$ or less, 1.00 kg/h·m$^2$ or more and 25.0 kg/h·m$^2$ or less, or 5.00 kg/h·m$^2$ or more and 25.0 kg/h·m$^2$ or less, per unit area of an evaporation surface of the short path distillation apparatus.

In the present invention, "feed rate of raw material oils and/or fats per unit area of an evaporation surface of the short path distillation apparatus" is the value obtained by dividing a feed rate of raw material oils and/or fats per hour by an area of an evaporation surface.

As a result of the present inventors' study, it has been found, surprisingly, that, even when the temperature condition in the short path distillation treatment is low, it is possible to more reduce the content of a saturated hydrocarbon in raw material oils and/or fats by lowering the feed rate of raw material oils and/or fats to an evaporation surface of a short path distillation apparatus. Specifically, when the upper limit of the temperature condition in the short path distillation treatment is 200° C. or lower (preferably 160° C. or lower), and the feed rate of raw material oils and/or fats to the short path distillation apparatus is 25.0 kg/h·m$^2$ or less (preferably 10.0 kg/h·m$^2$ or less, and more preferably 8.5 kg/h·m$^2$ or less) per unit area of an evaporation surface of the short path distillation apparatus, it is easier to reduce the content of a saturated hydrocarbon in raw material oils and/or fats. The lower limit of the temperature condition in the short path distillation treatment is not particularly limited, and may be 50° C. or higher. The lower limit of the feed rate of raw material oils and/or fats to the short path distillation apparatus is not particularly limited, and may be 1.0 kg/h·m$^2$ or more per unit area of an evaporation surface of the short path distillation apparatus.

When the temperature condition in the short path distillation treatment is low temperature of 50° C. or higher and 200° C. or lower, from the viewpoint of more easily reducing the content of a saturated hydrocarbon in raw material oils and/or fats, the upper limit of the feed rate of raw material oils and/or fats to a short path distillation apparatus may be 30.0 kg/h·m² or less (preferably 5.0 kg/h·m² or more and 25.0 kg/h·m² or less) per unit area of an evaporation surface of the short path distillation apparatus.

The pressure condition (degree of vacuum of an evaporator) in the short path distillation treatment is preferably close to 0 (zero) Pa from the viewpoint of easily removing a saturated hydrocarbon, a substance unstable to heat, a high boiling point substance and the like. Specifically, the short path distillation treatment in the present invention may be preferably performed under the degree of vacuum of 0.1000 Pa or less, more preferably 0.0800 Pa or less, still more preferably 0.0200 Pa or less, and most preferably 0.0100 Pa or less. The lower limit of the pressure condition in the short path distillation treatment is preferably the degree of vacuum of 0.0001 Pa or more.

Preferred pressure condition in the short path distillation treatment is, for example, in a range of 0.0001 Pa or more and 0.1000 Pa or less, 0.0001 Pa or more and 0.0800 Pa or less, 0.0001 Pa or more and 0.0200 Pa or less, or 0.0001 Pa or more and 0.0100 Pa or less.

The "degree of vacuum" in the present invention is indicated in terms of absolute pressure. This value shows to what extent the pressure is close to an ideal vacuum state (absolute vacuum), assuming that an absolute vacuum is zero.

As a result of the present inventors' study, it has been found, surprisingly, that, even when the temperature condition in the short path distillation treatment is low, it is possible to more reduce the content of a saturated hydrocarbon in raw material oils and/or fats by lowering the pressure of the short path distillation treatment. Specifically, when the upper limit of the temperature condition in the short path distillation treatment is 200° C. or lower (preferably 180° C. or lower), and the pressure condition is the degree of vacuum of 0.0001 Pa or more and 0.0200 Pa or less, it is easier to reduce the content of a saturated hydrocarbon in raw material oils and/or fats. In the above case, the lower limit of the temperature condition in the short path distillation treatment is not particularly limited, and may be 80° C. or higher.

The treatment time of the short path distillation treatment means the time during which oils and/or fats are present on an evaporation surface of a short path distillation apparatus and is not particularly limited, and may be preferably set at 0.5 second or more, more preferably 1 second or more, still more preferably 3 seconds or more, and yet more preferably 5 seconds or more, from the viewpoint of performing sufficient distillation. From the viewpoint of suppressing heat effect on raw material oils and/or fats, the treatment time of the short path distillation treatment may be preferably set at 5 minutes or less, more preferably 3 minutes or less, still more preferably 1 minute or less, and most preferably 30 seconds or less.

There is no particular limitation on the short path distillation apparatus to be used in the short path distillation treatment, and it is possible to use a falling film, centrifugal, climbing film, or wiped film evaporation apparatus. From the viewpoint of being capable of suppressing heat effect on raw material oils and/or fats because of low retention time of raw material oils and/or fats in the short path distillation apparatus, a wiped film evaporation apparatus is preferable. There is no particular limitation on the material of the evaporation surface of the short path distillation apparatus, it is possible to use glass and stainless steel.

It is possible to carry out the reduction method of the present invention at an optional timing in the refining step of raw material oils and/or fats. The reduction method of the present invention may be carried out, for example, before the fractionating step, before the deodorizing step, or after the deodorizing step. There is no particular limitation on the conditions of each refining step (degumming step, neutralization step, water washing step, bleaching step, deodorizing step, fractionating step, etc.) to be carried out before and after the reduction method of the present invention, and it is possible to apply the conditions which are usually employed in refining of oils and/or fats.

After carrying out the reduction method of the present invention, the thus obtained oils and/or fats may be directly circulated as refined oils and/or fats, or may be subjected to further refining step. For example, when raw material oils and/or fats are oils and/or fats obtained through the bleaching step, the oils and/or fats may be subjected to the deodorizing step after carrying out the reduction method of the present invention. When the raw material oils and/or fats are oils and/or fats obtained through the deodorizing step, the oils and/or fats may be subjected to the fractionating step after carrying out the reduction method of the present invention. When raw material oils and/or fats are unrefined oils and/or fats, the thus obtained oils and/or fats may be directly circulated as refined oils and/or fats, or may be subjected to further refining step after carrying out the reduction method of the present invention.

When raw material oils and/or fats are oils and/or fats which are not subjected to heating at 200° C. or higher (preferably 180° C. or higher), it is preferred that the content of diglyceride in oils and/or fats can be reduced by carrying out the reduction method of the present invention. Diglyceride is a causal substance of 3-chloropropane-1,2-diol (3-MCPD) and glycidol, which can be generated by heating oils and/or fats. Therefore, when raw material oils and/or fats to be subjected to the reduction method of the present invention are oils and/or fats which are not subjected to heating at 200° C. or higher (preferably 180° C. or higher), it is possible to suppress the generation of 3-MCPD and glycidol in the thus obtained refined oils and/or fats. Examples of the step of heating oils and/or fats at 200° C. or higher (preferably 180° C. or higher) usually include the deodorizing step. Therefore, examples of oils and/or fats which are not subjected to heating at 200° C. or higher (preferably 180° C. or higher) include oils and/or fats which are not subjected to the deodorizing step. In other words, it is preferred that the reduction method of the present invention is carried out before the deodorizing step.

The effect of reducing the content of a saturated hydrocarbon can be obtained by carrying out the reduction method of the present invention of raw material oils and/or fats once. By repeatedly carrying out the reduction method of the present invention two times or more, the reduction effect can be obtained more effectively. For example, it is possible to repeatedly carry out the reduction method of the present invention, preferably two times or more, and more preferably three times or more. There is no particular upper limitation of the number of times of carrying out the reduction method of the present invention, and it may be five times or less. When the reduction method of the present invention is carried out plural times, the reduction method may be continuously carried out, or other steps (for example, fractionating step) may be carried out between the respective reduction methods.

[Raw Material Oils and/or Fats]

There is no particular limitation on raw material oils and/or fats to be subjected to the reduction method of the present invention, and it is possible to use optional oils and/or fats. For example, refined oils treated by the degumming step, the neutralization step, and the water washing step may be used, or unrefined oils may be used. A main component in raw material oils and/or fats is glyceride, and other components may include, for example, hytosterol, lecithin, an antioxidative component (tocopherol, etc.), a pigment component, and the like.

When raw material oils and/or fats are refined oils, the refining method of oils and/or fats is not particularly limited, and may be either a chemical refining method or a physical refining method. The chemical refining method of the former is a refining method in which crude oils obtained by compression and extraction of plants as raw materials are refined through an alkali neutralization treatment. For example, it is a refining method in which crude oils are refined through a degumming treatment, an alkali neutralization treatment, a bleaching treatment, a dewaxing treatment, and a deodorization treatment, thus obtaining refined oils. The physical refining method of the latter is a refining method in which crude oils are not subjected to an alkali neutralization treatment. For example, it is a refining method in which crude oils are refined through a degumming treatment, a neutralization treatment due to distillation without using an alkali, a bleaching treatment, and a deodorization treatment, thus obtaining refined oils.

Raw material oils and/or fats are preferably those in which impurities are removed to some extent, and it is possible to preferably use, for example, oils and/or fats through the deodorizing step, refined bleached deodorized (RBD) oils through the neutralization step, the bleaching step, and the deodorizing step, and the like.

There is no particular limitation on type of raw material oils and/or fats, and it is possible to use vegetable oils such as rapeseed oil, soybean oil, rice oil, safflower oil, grape seed oil, sunflower oil, wheat germ oil, corn oil, cottonseed oil, sesame oil, peanut oil, linseed oil, perilla oil, olive oil, palm oil, and coconut oil; mixed vegetable oils obtained by mixing two or more vegetable oils thereof; or edible fractionated oils obtained by fractionation of these vegetable oils, such as palm olein, palm stearin, palm super olein, and palm mid fraction; hydrogenated oils thereof; interesterified oils thereof; or edible oils produced by a direct esterification reaction, such as medium chain fatty acid triglyceride.

From the viewpoint of easily obtaining the effects of the present invention, raw material oils and/or fats are preferably palm-based oils and/or fats. Examples of palm-based oils and/or fats include palm-derived oils and/or fats. Examples of specific palm-based oils and/or fats include palm oil, palm kernel oil, fractionated oil of palm oil, fractionated oil of palm kernel oil, hydrogenated oil of palm oil, hydrogenated oil of palm kernel oil, hydrogenated oil of fractionated oil of palm oil, hydrogenated oil of fractionated oil of palm kernel oil, and interesterified oil thereof. Examples of the fractionated oil of palm oil include super olein, palm olein, palm mid fraction, and palm stearin; and examples of the fractionated oil of palm kernel oil include palm kernel olein and palm kernel stearin.

[Specification of Content of Saturated Hydrocarbon in Refined Oils and/or Fats]

According to the reduction method of the present invention, it is possible to obtain refined oils and/or fats in which the content of a saturated hydrocarbon is reduced. According to the reduction method of the present invention, it is possible to obtain refined oils and/or fats in which the content of a saturated hydrocarbon particularly having 20 or more and 35 or less carbon atoms is reduced.

For example, when raw material oils and/or fats are palm-based oils and/or fats, according to the reduction method of the present invention, it is possible to obtain refined palm-based oils and/or fats in which the content of a saturated hydrocarbon having 20 or more and 35 or less carbon atoms is preferably 15 mg/kg or less, more preferably 10 mg/kg or less, still more preferably 5.0 mg/kg or less, and most preferably 2.0 mg/kg or less. The lower limit of the content of a saturated hydrocarbon having 20 or more and 35 or less carbon atoms in refined palm-based oils and/or fats subjected to the reduction method of the present invention is preferably 0 mg/kg or detection limit or less, and may be 1.5 mg/kg or more.

According to the reduction method of the present invention, it is also possible to reduce an acid value and a peroxide value of refined oils and/or fats.

The content of a saturated hydrocarbon in oils and/or fats, the acid value, and the peroxide value are specified by the methods mentioned in Examples.

EXAMPLES

The present invention will be specifically described below by way of Examples, but the present invention is not limited to these Examples.

<Test 1: Study on Various Conditions in Short Path Distillation Treatment>

Raw material palm-based oils and/or fats (which are RBD palm oils and correspond to raw material oils and/or fats) were injected into an evaporation surface of a short path distillation apparatus, Model KDL6 (manufactured by UIC GmbH, evaporation surface made of stainless steel: 600 cm$^2$, condensation surface: 600 cm$^2$, maximum flow rate: 3 to 10 L/hour) and then a short path distillation treatment was performed under the conditions shown in Table 1. The retention time of raw material palm-based oils and/or fats on the evaporation surface of the short path distillation apparatus (in other words, treatment time of short path distillation treatment) was set at 1 second or more and 30 seconds or less.

After the short path distillation treatment under the above conditions, a residual fraction and a distillation fraction were collected. In Table 1, "distillation fraction ratio" means a proportion of the distillation fraction in the total amount of the thus collected residual fraction and distillation fraction. The lower the distillation fraction ratio, the higher a yield becomes.

Regarding raw material palm-based oils and/or fats before a short path distillation treatment, and a residual fraction after the short path distillation treatment (which corresponds to refined oils and/or fats), physical properties and composition were studied as follows. The results are shown in Table 1.

[Color]

Color (Y value, R value) was measured in accordance with "2.2.1-1996 Lovibond Method in "Standard Methods for the Analysis of Fats, Oils and Related Materials" edited by Japan Oil Chemists' Society". In the measurement, Lovibond colorimeter (cell length: 133.4 mm) was used.

[Acid Value]

An acid value was measured in accordance with "2.3.1-1996 Acid Value in "Standard Methods for the Analysis of Fats, Oils and Related Materials" edited by Japan Oil Chemists' Society".

[Peroxide Value]

A peroxide value was measured in accordance with "2.5.2.1-2013 Peroxide Value in "Standard Methods for the Analysis of Fats, Oils and Related Materials" edited by Japan Oil Chemists' Society"

[Conductometric Determination Method (CDM)]

Conductometric Determination Method (CDM) was measured in accordance with "2.5.1.2-1996 in "Standard Methods for the Analysis of Fats, Oils and Related Materials" edited by Japan Oil Chemists' Society". The higher the measured value of CDM, the more oils and/or fats are autoxidated.

[Melting Point(Slipping Point)]

A Melting point (Slipping Point) was measured in accordance with "2.2.4.2-1996 in "Standard Methods for the Analysis of Fats, Oils and Related Materials" edited by Japan Oil Chemists' Society".

[Determination of Saturated Hydrocarbon Content]

The content of a saturated hydrocarbon was measured in accordance with the following method.

(1) To 200 mg of each of oil and/or fat samples, 3 ppm of an internal standard material (bicyclohexyl) was added, followed by dissolution with 1 mL of hexane.

(2) In a 2 g of a silica solid-phase extraction column conditioned with hexane, the sample in (1) was charged and then adsorbed.

(3) A saturated hydrocarbon was eluted with hexane from the column in (2). After disposing 1 mL of the saturated hydrocarbon eluted initially, 3 mL of the saturated hydrocarbon eluted subsequently was recovered, thus obtaining a saturated hydrocarbon fraction.

(4) After concentrating the saturated hydrocarbon fraction to about 300 μL, measurements were made with gas chromatography (on-column injection) under the following conditions.

(4-1) Column
Precolumn: inactivated fused silica column, 10 m in length, 0.53 mm in inner diameter
Analysis column: 100% dimethylpolysiloxane, 15 m in length, 0.32 mm in inner diameter, 0.1 μm in thickness (4-2) Injection
Carrier gas: Helium
Injection amount: 40 μL
Inlet temperature condition: 60° C. (retention for 4 minutes)→ temperature rise at 20° C./minute-380° C. (retention for 15.5 minutes)
Pressure conditions: 60 kPa (retention for 4 minutes) pressure rise at 70 kPa/minute-130 kPa (retention for 30.5 minutes)
Column flow rate: 3.55 mL/minute (4-3) Oven
Temperature: 50° C. (retention for 4 minutes)→temperature rise at 20° C./minute-380° C. (retention for 15 minutes)

(4-4) FID detector
Temperature: 380° C.

(5) Using a chromatogram obtained by gas chromatography measurement in (4) above, the content of the saturated hydrocarbon was specified by making a comparison between an area of the internal standard material and an area of the saturated hydrocarbon (area of a hump building from a base line).

In the following tables, "C20-35" means an amount of a saturated hydrocarbon having 20 or more and 35 or less carbon atoms among saturated hydrocarbons. "C10-56" means an amount of a saturated hydrocarbon having 10 or more and 56 or less carbon atoms among saturated hydrocarbons.

TABLE 1

|  | Raw material palm-based oils and/or fats | Example 1 | Example 2 | Example 3 | Example 4 | Example 5 |
| --- | --- | --- | --- | --- | --- | --- |
| Evaporator temperature (° C.) | — | 200 | 220 | 230 | 240 | 250 |
| Evaporator vacuum degree (Pa) | — | 0.0500 | 0.0500 | 0.0500 | 0.0500 | 0.0500 |
| Feed rate of oils and/or fats to evaporation surface (kg/h) | — | 0.5 | 1.5 | 1.5 | 1.5 | 1.5 |
| Feed rate of oils and/or fats per unit area of evaporation surface (kg/h · m²) | — | 8.30 | 25.0 | 25.0 | 25.0 | 25.0 |
| Distillation fraction ratio (%) | — | 3.4 | 2.3 | .4.0 | 6.7 | 9.5 |
| Color (Y value/R value) | 14/1.4 | 32/3.2 | 21/2.1 | 21/2.1 | 16/1.6 | 20/2.0 |
| Acid value | 0.05 | 0.02 | 0.02 | 0.02 | 0.02 | 0.02 |
| Peroxide value | 0.2 | 0.2 | 0.0 | 0.0 | 0.0 | 0.0 |
| CDM (Time) | 14.74 | 2.55 | 3.93 | 4.24 | 4.59 | 4.01 |
| Slipping inciting point (° C.) | 39.0 | 38.0 | 38.5 | 38.3 | 38.4 | 37.3 |
| Saturated hydrocarbon C20-35 (mg/kg) | 17 | <2 | <2 | <2 | <2 | <2 |
| C10-56 (mg/kg) | 39 | 10 | 15 | 14 | 12 | 10 |

As shown in Table 1, it has been found that according to the reduction method of the present invention, it is possible to obtain refined oils and/or fats having low content of a saturated hydrocarbon (refined palm-based oils and/or fats). According to the reduction method of the present invention, an increase in acid value or peroxide value, and autoxidation were suppressed.

As shown in Examples 2 to 5, it has been found that, the higher the temperature (evaporator temperature) of the short path distillation treatment, the more the content of a saturated hydrocarbon can be reduced. From the viewpoint of reducing the content of a saturated hydrocarbon while increasing a yield by reducing a distillation fraction ratio, the temperature of the short path distillation treatment is preferably 230° C. or lower.

As shown from a comparison between Example 1 and Example 5, it has been found that, even when the temperature of the short path distillation treatment is low, it is also possible to obtain refined oils and/or fats having low content of a saturated hydrocarbon by lowering the feed rate of raw material oils and/or fats to an evaporation surface of a short path distillation apparatus, as is the case with high temperature of the short path distillation treatment.

<Test 2: Study on Temperature Conditions in Short Path Distillation Treatment>

In the same manner as in Test 1, raw material palm-based oils and/or fats (which are RBD palm oils and correspond to raw material oils and/or fats) were subjected to a short path distillation treatment under the conditions shown in Table 2. Regarding raw material palm-based oils and/or fats before a short path distillation treatment, and a residual fraction after the short path distillation treatment (which corresponds to refined oils and/or fats), the content of a saturated hydrocarbon was measured in the same manner as in Test 1. The results are shown in Table 2.

As shown in Table 2, it has been found that the higher the temperature (evaporator temperature) of the short path distillation treatment, the more the content of a saturated hydrocarbon can be reduced.

Even when the temperature of the short path distillation treatment is low, there is a tendency to obtain refined oils and/or fats having low content of a saturated hydrocarbon by lowering the pressure (degree of vacuum of an evaporator) of a short path distillation treatment, as is the case with high temperature of the short path distillation treatment.

<Test 3: Study on Number of Short Path Distillation Treatment>

In the same manner as in Test 1, raw material palm-based oils and/or fats (which are RBD palm oils and correspond to raw material oils and/or fats) were subjected to a short path distillation treatment under the conditions shown in Table 3 and then a residual fraction was collected ("1 Pass" in Table 3). Next, the residual fraction (1 Pass) was subjected again to similar short path distillation treatment and then a residual fraction was collected ("2 Pass" in Table 3). Next, the residual fraction (2 Pass) was subjected again to similar short path distillation treatment and then a residual fraction was collected ("3 Pass" in Table 3). Regarding 10 g of raw material palm-based oils and/or fats before a short path distillation treatment, and 10 g of each residual fraction after the short path distillation treatment (which corresponds to refined oils and/or fats), the content of a saturated hydrocarbon was measured in the same manner as in Test 1. The results are shown in Table 3.

TABLE 2

| | Raw material palm-based oils and/or fats | Example 6 | Example 7 | Example 8 | Example 9 | Example 10 | Example 11 | Example 12 |
|---|---|---|---|---|---|---|---|---|
| Evaporator temperature (° C.) | — | 80 | 100 | 120 | 140 | 160 | 180 | 200 |
| Evaporator vacuum degree (Pa) | — | 0.0068 | 0.0068 | 0.0068 | 0.0068 | 0.0068 | 0.0096 | 0.0097 |
| Feed rate of oils and/or fats to evaporation surface (kg/h) | — | 1.5 | 1.5 | 1.5 | 1.5 | 1.5 | 1.5 | 1.5 |
| Feed rate of oils and/or fats per unit area of evaporation surface (kg/h · m$^2$) | — | 25.0 | 25.0 | 25.0 | 25.0 | 25.0 | 25.0 | 25.0 |
| Saturated hydrocarbon C20-35 (mg/kg) | 19 | 10 | 13 | 10 | 10 | 11 | 7 | 4 |

TABLE 3

| | Raw material palm-based oils and/or fats | 1 Pass | 2 Pass | 3 Pass |
|---|---|---|---|---|
| Evaporator temperature (° C.) | — | 80 | 80 | 80 |
| Evaporator vacuum degree (Pa) | — | 0.0068 | 0.0072 | 0.0075 |
| Feed rate of oils and/or fats to evaporation surface (kg/h) | — | 1.5 | 1.5 | 1.5 |
| Feed rate of oils and/or fats per unit area of evaporation surface (kg/h · m$^2$) | — | 25.0 | 25.0 | 25.0 |
| Saturated hydrocarbon C20-35 (mg/kg) | 19 | 9 | 8 | 7 |

As shown in Table 3, it has been found that it is possible to more reduce the content of a saturated hydrocarbon by repeating a short path distillation treatment.

The invention claimed is:

1. A method for reducing a content of all C20-C35 saturated hydrocarbons in raw material oils and/or fats, to produce refined oils and/or fats, the method comprising subjecting raw material oils and/or fats to a short path distillation treatment at a temperature of 200° C. or higher to reduce the content of all C20-C35 saturated hydrocarbons from the oils and/or fats, wherein, in the short path distillation treatment, a feed rate of the raw material oils and/or fats to a short path distillation apparatus is 8.3 to 25.0 kg/h·m$^2$ per unit area of an evaporation surface of the short path distillation apparatus, wherein the raw material oils and/or fats are palm-based oils and/or fats, wherein a degree of vacuum in the short path distillation treatment is 0.05 Pa, and wherein the content of all C20-C35 saturated hydrocarbons is reduced to less than 2 mg/kg.

2. The method according to claim 1, wherein the feed rate is 8.3 kg/h·m$^2$ per unit area of the evaporation surface of the short path distillation apparatus.

3. The method according to claim 1, wherein an upper limit of the temperature in the short path distillation treatment is 200° C., and the feed rate of the raw material oils and/or fats to the short path distillation apparatus is 8.3 to 25.0 kg/h·m$^2$ per unit area of an evaporation surface of the short path distillation apparatus.

4. The method according to claim 1, wherein an upper limit of the temperature in the short path distillation treatment is 200° C., and the feed rate of the raw material oils and/or fats to the short path distillation apparatus is 8.3 kg/h·m$^2$ per unit area of an evaporation surface of the short path distillation apparatus.

5. The method according to claim 1, wherein the short path distillation treatment is performed two times or more.

* * * * *